April 30, 1940.  W. J. MUNDY  2,198,594
CONVEYER
Filed March 10, 1938
FIG. 1.
FIG. 2.
FIG. 3.
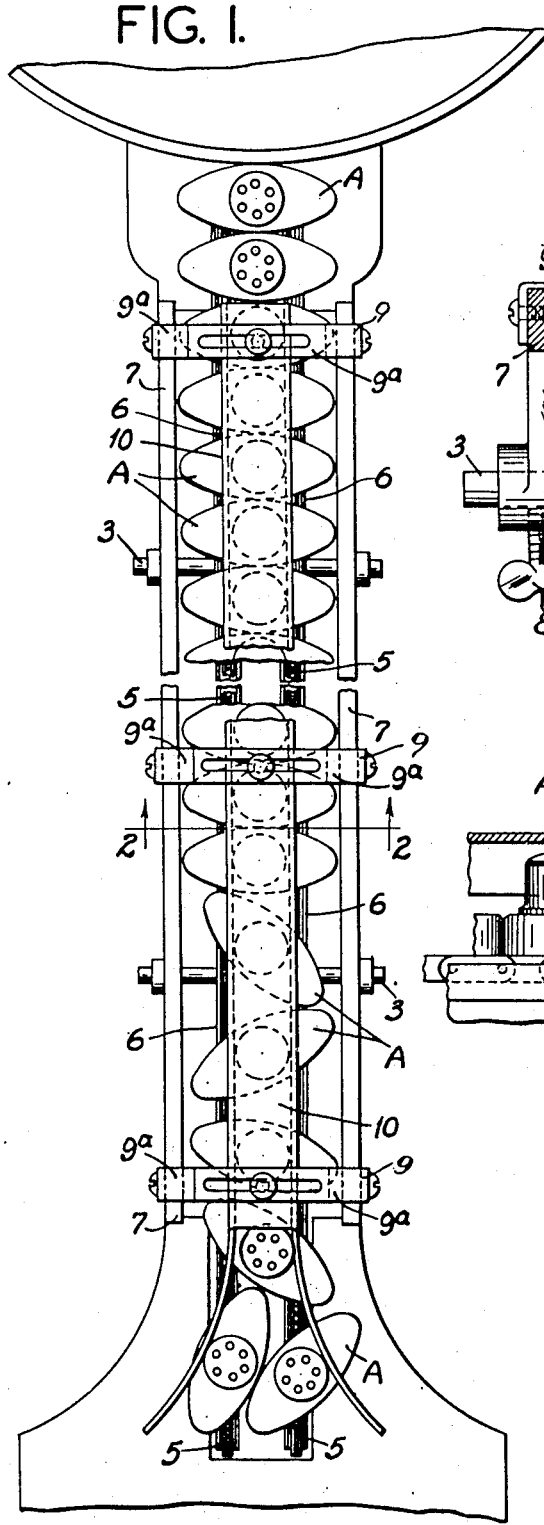
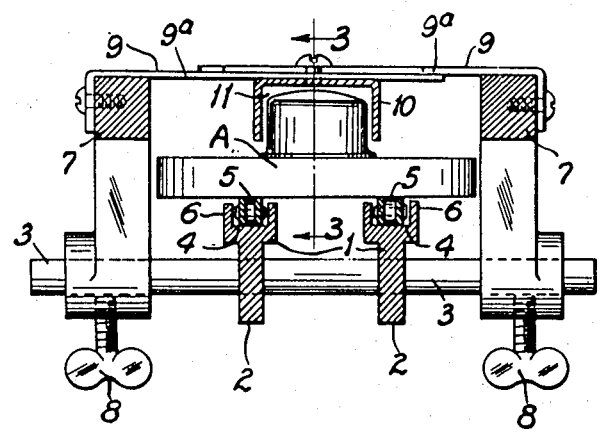
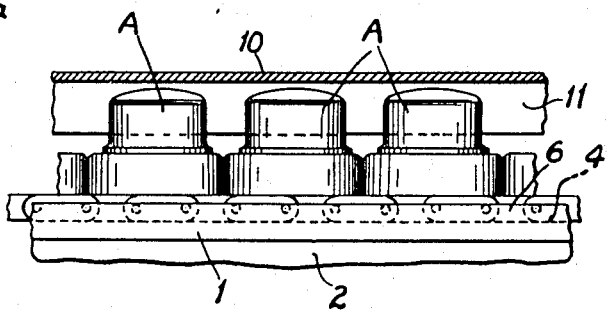
INVENTOR;
WILLIAM J. MUNDY
BY Henry Kinealy,
ATTORNEY Patented Apr. 30, 1940

2,198,594

UNITED STATES PATENT OFFICE 2,198,594

CONVEYER

William J. Mundy, University City, Mo., assignor to C. T. Small Manufacturing Company, St. Louis, Mo., a corporation of Missouri Application March 10, 1938, Serial No. 195,052

5 Claims. (Cl. 198—29)

My invention relates to conveyers and more particularly to a conveyer adapted to feed to a device at the discharge end thereof articles arranged in the same relative position to each other.

The conveyers as used heretofore were adapted particularly for feeding to a filling or capping machine articles such as cans, bottles and the like, which were shaped so that they could be arranged on the conveyer in a number of positions and still be fed properly to the device at the discharge end of the conveyer. For instance, round articles could rotate about their axis to an infinite number of positions and still present a surface of the same contour to the device at the discharge end of the conveyer. Likewise, square articles could be positioned in one of four different ways and still present a surface of the same contour to the device. In conveyers used for moving articles of this kind, the articles were guided with sufficient accuracy by forming at the sides of the conveyer guide rails separated a distance sufficient to permit the articles to pass therebetween. When feeding square articles into a filling or capping machine the guide rails on the conveyer were separated from each other a distance equal to the length of a side of the article so that the articles could assume only one of the four positions mentioned above when on the conveyer. If round articles were fed into the filling or capping machine the guide walls were separated a distance equal to the diameter of the articles.

When articles having a length greater than their width are fed into a machine by a conveyer as used heretofore, if the guide rails are separated a distance equal to the length of the articles, the articles are likely to shift their positions between the guide rails so that two or more articles may pass side by side along the conveyer. If the conveyer is used to feed covers to a capping machine, the covers at the discharge end of the conveyer will not be in registry with the containers positioned in the machine and adapted to receive the covers. The containers and covers, therefore, are likely to be bent out of shape, and parts of the machine may be injured during the capping operation.

At present, the containers usually are filled and capped by the same machine and it is necessary that the container, while being filled, be in registry with the filling spout as long as possible so that the container may move continuously and pass under the spout at high speed. The machines usually have a circular rotating table to move the containers under the filling spouts, and the containers are placed on the table with their longitudinal axis parallel to the direction of movement. For this reason, it is necessary that the covers be positioned on the conveyer with their longitudinal axis perpendicular to the longitudinal axis of the conveyer so that the covers are in registry with the containers when the covers are discharged from the conveyer to the machine. It is not feasible, therefore, to guide the articles on the conveyer by separating the guide rails a distance equal to the width of the articles because the containers in the filling machine then must be placed with their longitudinal axis perpendicular to the direction of movement, and the speed at which the table rotates must be decreased so that the opening in the container is in registry with the filling spout a sufficient time to fill the can entirely.

In view of the deficiencies of conveyers as used heretofore, my invention contemplates a conveyer adapted to feed properly positioned articles one at a time to a device at the discharge end of the conveyer. The conveyer is adapted especially to feed articles, such as talcum powder covers, having a length substantially greater than their width and having a projection protruding from a surface thereof.

The conveyer comprises a member having therein a channel adapted to engage the projections on the articles and thereby guide the articles as they move along the conveyer, and the channel at the receiving end thereof is flared so that articles positioned side by side will enter the narrower portion of the channel one at a time without blocking the entry and jamming the conveyer. A pair of chains or other suitable expedient is provided to move the articles from the receiving end of the conveyer to the discharge end thereof and the chains are adapted to move faster than the articles on the conveyer at the discharge end whereby the articles at this end are aligned in the correct position before passing from the conveyer to the capping and filling machine.

Having described briefly my new and improved conveyer the objects of my invention therefore are to provide a conveyer which is simple in operation and cheap in cost and which will feed articles one at a time in the same relative position to each other to a device at the discharge end of the conveyer.

Other objects and advantages will be apparent to those skilled in the art from the following description wherein reference is made to the drawing illustrating a preferred embodiment of my invention and wherein similar reference numerals designate similar parts throughout the several views.

A conveyer constructed according to my invention is shown in the drawing wherein Fig. 1 is a plan view thereof.

Fig. 2 is a vertical section on the line 2—2 of Fig. 1, and

Fig. 3 is a vertical section on the line 3—3 of Fig. 2.

Referring to the drawing, one embodiment of a conveyer constructed according to my invention is shown therein comprising a bed 1 formed by a pair of members 2 spaced a suitable distance from each other and carried by the bars 3. The members 2 may be mounted rigidly on the bars 3, as shown particularly in Fig. 2, and may be mounted adjustably thereon so that the distance between the members may be varied to accommodate articles of various sizes. Each of the members has a pair of side walls 6 forming therebetween a trough 4 provided with a chain 5 adapted to slide therethrough and arranged to protrude above the side walls 6 so that articles, as designated by A, rest on the chain 5 and are moved thereby from the receiving end of the conveyer to the discharge end thereof. Each chain 5 extends the entire length of the conveyer and meshes with a pair of sprockets (not shown in the drawing) one at each end thereof. The sprockets may be rotated by a motor or other suitable device through necessary gearing to impart movement to the chains 5.

Parallel and adjacent to each of the members 2 is a rail 7 mounted adjustably on the bars 3 so that the rails 7 may be separated any desired distance to accommodate articles of various sizes, and, in the present embodiment, thumb screws 8 are provided for that purpose.

Mounted on a bracket 9 carried by the rails 7 and positioned above the moving chains 5, is a member 10 having formed therein a channel 11 adapted to engage the projections protruding from the surfaces of the articles and arranged to guide the articles as they move from the receiving end of the conveyer to the discharge end thereof. As shown in Fig. 2, the member 10 is positioned centrally above the chains 5, but the member may be arranged in any desired position relative thereto to accommodate articles of various kinds and shapes so that the articles may be centered on the chains. For this reason, the bracket 9 preferably is formed of a pair of slotted parts 9a so that the bracket can be adjusted to various lengths and so that the member 10 may be arranged in any desired position relative to the chains 5.

As implied above, the channel 11 in the member 10 preferably is slightly larger than the projections on the articles so that the articles move freely with the chains 5 and are maintained in a central position thereon. However, at the receiving end of the conveyer the channel 11 is flared considerably so that if two articles are introduced into the conveyer side by side one article will precede the adjacent article and move forward along the conveyer before the adjacent article and be centered on the chains 5. By forming the channel 11 at the receiving end of the conveyer in this manner the articles can not jam at this point.

As shown in Fig. 1, at the receiving end of the conveyer some of the articles are positioned with their longitudinal axis at various angles to the chains 5, though the articles are centered thereon. For this reason, the chains 5 are arranged to move faster than do the articles at the discharge end of the conveyer, and it is necessary, therefore, that the articles rest periodically on the conveyer and congregate at the discharge end thereof. As the articles approach this end of the conveyer they contact each other and forward movement of the articles is retarded, and, as each article contacts the preceding article on the conveyer, each article will assume a position whereby the longitudinal axis of the article is perpendicular to the bed 1 of the conveyer. Therefore, at the discharge end, all of the articles are in the same position relative to each other.

The conveyer operates as follows: Articles are placed on the chains 5 at the receiving end of the conveyer, and the chains move the articles from the receiving end to the discharge end thereof. As the articles move from the flared portion to the narrow part of the channel 11, the articles are centered automatically on the chains 5 and because the chains move faster than do the articles at the discharge end, the articles at this end contact adjacent articles and are aligned so that the longitudinal axis of the articles is perpendicular to the longitudinal axis of the conveyer. Obviously, when an article is discharged from the conveyer to the capping machine, the article is in this position and in registry with the article positioned in the capping machine and adapted to receive the article from the conveyer.

When articles having a projection thereon, as described briefly above, are moved over the conveyer, the rails 7 are unnecessary and may be removed if desired, since the articles are guided by the member 10. If the rails 7 are not used, any suitable support may be utilized to maintain the member 10 properly positioned above the chains.

Other arrangements may be used without deviating from the scope of my invention, and while I describe a particular construction embodying my invention, it is of course evident that the construction may be varied in many particulars and I, therefore, do not limit myself to the form and arrangement shown and described.

What I claim as new and desire to secure by Letters Patent, is:

1. An orienting conveyer device adapted to feed articles that are longer than they are wide and that have an upwardly extending projection smaller than either body dimension and to deliver said articles one at a time and with their short axis parallel to the path of movement of the articles, comprising a conveyer on which said articles rest which conveyer moves more rapidly than the articles at the discharge end and a guide member fitting loosely over said projections, whereby the comparatively rapid movement of said conveyer causes said articles to pivot about their projections and to assume a position with their short axis parallel to their path of movement.

2. An orienting conveyer device adapted to feed articles that are longer than they are wide and that have an upwardly extending projection smaller than either body dimension and to deliver said articles one at a time and with their short axis parallel to the path of movement of the articles, comprising a conveyer on which said articles rest which moves more rapidly than the articles at the discharge end and a narrow channel guide member above said conveyer fitting loosely over said projections, whereby the crowding of said articles at the discharge end causes them to pivot about their projections and to assume a position with their short axis parallel to their path of movement.

3. An orienting conveyer device adapted to feed articles that are longer than they are wide and that have an upwardly extending projection smaller than either body dimension and to deliver said articles one at a time and with their short axis parallel to the path of movement of the articles, comprising a conveyer on which said articles rest which moves more rapidly than said articles at the discharge end, guides on each side of said conveyer the distance between said guides being substantially equal to the length of said articles and a guide member above said conveyer fitting loosely over said projections, whereby the comparatively rapid movement of said conveyer causes said articles to pivot about their projections and to assume a position with their short axis parallel to their path of movement.

4. An orienting conveyer device adapted to feed articles that are longer than they are wide and that have an upwardly extending circular projection smaller than either body dimension and to deliver said articles one at a time and with their short axis parallel to the path of movement of the articles, comprising a conveyer on which said articles rest which moves more rapidly than said articles at the discharge end and a continuous guide member above said conveyer fitting loosely over said projections, whereby the comparatively rapid movement of said conveyer causes said articles to crowd at the discharge end and thereby to pivot about their projections and to assume a position with their short axis parallel to their path of movement, and a flaring entrance for said guide member.

5. An orienting conveyer device adapted to feed articles that are longer than they are wide and that have an upwardly extending projection smaller than either body dimension and to deliver said articles one at a time and with their short axis parallel to the path of movement of the articles, comprising a conveyer on which said articles rest which conveyer moves more rapidly than the articles at the discharge end and a guide member secured to a bracket comprising slotted parts permitting said guide member to be adjusted to a position relative to the conveyer, said guide member fitting loosely over said projections, whereby the comparatively rapid movement of said conveyer causes said articles to pivot about their projections and to assume a position with their short axis parallel to their path of movement.

WILLIAM J. MUNDY.